Dec. 31, 1940.　　　　H. J. SMITH　　　　2,227,281
TAP
Filed March 7, 1939
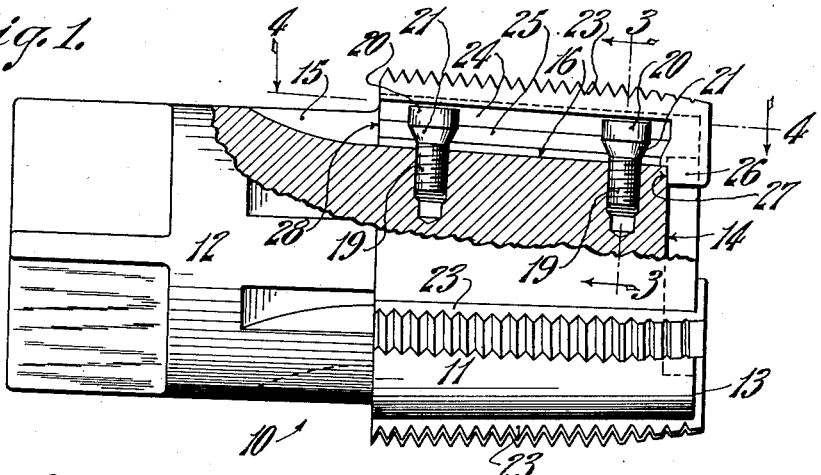
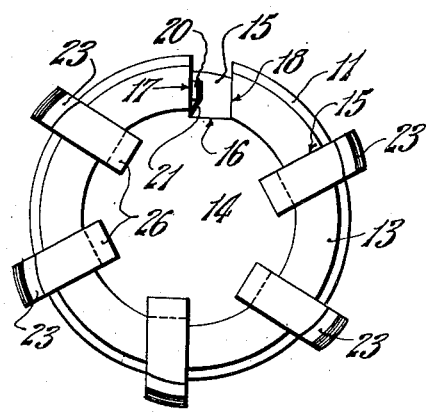
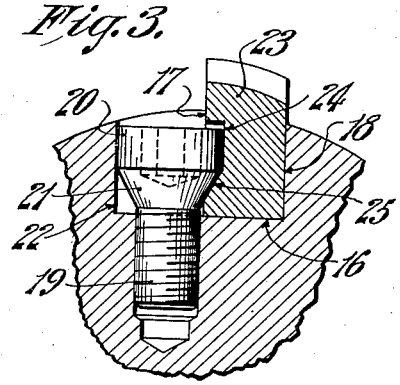
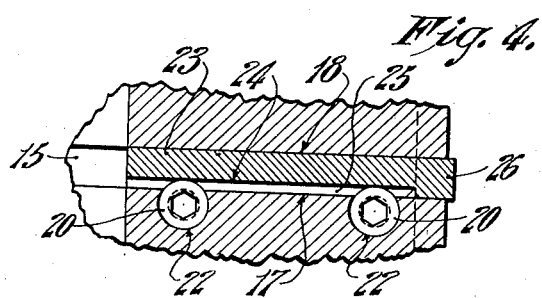
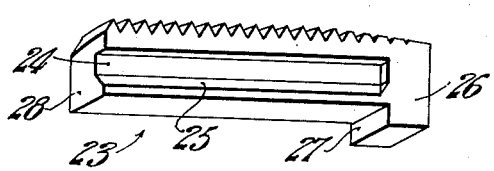
INVENTOR,
Herbert J. Smith,
BY
Blake Cleaver
ATTORNEY.

Patented Dec. 31, 1940

2,227,281

UNITED STATES PATENT OFFICE 2,227,281

TAP

Herbert J. Smith, Greenfield, Mass.

Application March 7, 1939, Serial No. 260,327

7 Claims. (Cl. 10—146)

This invention relates to improvements in taps, and is particularly pertinent to that type of tap in which the lands are separate from the body of the tap and are removably inserted in and secured in the tap body.

An object of this invention is to provide, in a tap of the class described, means for solidly and accurately anchoring and securing an insertable land in the tap body, and efficient, accurate means for longitudinally aligning the insertable lands in the tap body, relative to each other.

A further object of this invention is to provide, in an inserted land tap, means for positively anchoring the lands longitudinally, against axial thrust when the tap is in use.

Another important object of this invention is to provide, in an inserted land tap, means for accurately locating and securing each land relative to the others, both circumferentially and radially.

A still further object of this invention is to provide an inserted land tap construction embodying the above objects which is simple and sturdy of construction and economical of manufacture.

These, and other objects and advantages of this invention, will be more completely described and disclosed in the following specification, the accompanying drawing, and the appended claims.

Broadly, this invention comprises a cylindrical body member provided with a plurality of longitudinal slots, an insertable land removably secured in each of the slots, each of the lands being formed with a longitudinal groove having a tapered surface and a radially and inwardly extending nose portion bearing against the working end of the body member, and locking elements in the body portion and provided with tapered heads bearing against the tapered surface of the land groove.

A preferred embodiment of this invention is illustrated in the accompanying drawing, in which:—

Fig. 1 is a side elevational view, partially in section, of an inserted land tap, Fig. 2 is an end view of the same, with one of the lands removed, Fig. 3 is a partial, cross sectional view, at an enlarged scale, taken on the line 3—3 of Fig. 1, Fig. 4 is a partial, sectional view, taken on the line 4—4 of Fig. 1, and Fig. 5 is a perspective view of one of the lands.

Referring now to the drawing in detail, in which like numerals refer to like parts throughout.

A tap body 10, having the usual nose portion 11 and shank 12, is counterbored at the working end 13 of the nose portion 11 to provide a recessed face 14. The tap body 10 is also formed with land slots 15, extending from the end 13, rearwardly into the shank portion 12. The slots 15 have bottom surfaces 16, and front and rear wall surfaces 17 and 18 respectively. A pair of locking screws 19, provided with heads 20 having tapered portions 21, are secured in the nose portion 11 adjacent each slot 15, as indicated in Fig. 1 and Fig. 3, with the heads 20 located in bores 22 and projecting into the slots 15 through the front wall 17, as indicated in Fig. 2.

Lands 23 are formed with longitudinally extending grooves 24, each of the grooves 24 being formed with a tapering bottom surface 25 designed to be engaged by the tapered portion 21 of the heads 20 on the locking screws 19. Each of the lands 23 is slidably supported in one of the slots 15, and is formed with a nose portion 26 providing a shoulder 27 which impinges against the surface 14 of the tap nose 11 to oppose the thrust of the work when the tap is used, and to accurately position the land in the groove longitudinally.

The rear ends 28 of the lands 23 are free in the slots 15, and do not abut against shoulders in the shank 12 of the tap body 10, so that the longitudinal position of the land in the slot is controlled entirely by contact of the shoulder 27 against the surface 14.

The locking screws 19 may be loosened by a slight partial turn, which will relieve the land 23 and permit the land 23 to be withdrawn from the tap body by sliding the land forwardly, away from the surface 14, until it emerges from the slot 15. A new land may be easily inserted by reversing this sliding movement. As the locking screws 19 are tightened, engagement of the cam surfaces 25 and 21 will force the land 23 against the bottom surface 16 and rear surface 18 of the slot 15, thus at one and the same time locking the land in place and accurately positioning the land both circumferentially and radially, relative to the tap body and the other lands.

What I claim is:

1. An inserted land tap comprising a body member provided with a plurality of land-receiving grooves, a pair of locking screws threadably secured in said body member adjacent each of said grooves, said locking screws being formed with tapered head portions projecting into said grooves, land members longitudinally slidable and removably located in said grooves, each of said land members being formed with a longitudinal slot providing an oblique surface engaged by the tapered surfaces on said screw heads.

2. A tool of the character described, comprising a body member provided with a plurality of land-receiving grooves, a locking element threadably secured in said body member adjacent each of said grooves and provided with a tapered head which projects into said groove, land members longitudinally slidable and removably located in said grooves, each of said land members being formed with a longitudinal slot having an oblique surface engaged by the tapered head of said locking element, each of said land members being also formed with a downwardly extending nose portion at one end only and engaging the front end of the body member for resisting the thrust of work engaged by said tool.

3. In a tap construction of the character described, a carrier provided with a land slot, a land arranged in said land slot and formed with a longitudinal slot in a side thereof, the side of said longitudinal slot nearest the axis of said carrier being slanted, a pair of locking screws in said carrier and formed with tapered head portions which engage the slanted side of said longitudinal slot for locking said land in said land slot.

4. In a tap construction of the character described, a cylindrical carrier formed with a shank and a nose portion, said nose portion being formed with a recess in the end thereof and with a plurality of land slots communicating with said recess, a land longitudinally slidable and removably located in each of said land slots, each of said lands being formed at one end only with a radially and inwardly projecting nose providing a shoulder engaging the inner surface of said recess.

5. In a tap construction of the character described, a cylindrical carrier formed with a shank and a nose portion, said nose portion being formed with a recess in the end thereof and with a plurality of land slots communicating with said recess, a land axially slidable and removably located in each of said land slots, each of said lands being formed at one end only with a radially and inwardly projecting nose providing a shoulder engaging the inner surface of said recess, and means for locking said lands in said land slots.

6. In a tap construction of the character described, a cylindrical carrier formed with a shank and a nose portion, said nose portion being formed with a recess in the end thereof and with a plurality of land slots communicating with said recess, a land longitudinally slidable in and removably located in each of said land slots, each of said lands being formed at one end only with a radially and inwardly projecting nose providing a shoulder engaging the inner surface of said recess, each of said lands being also formed with a longitudinal slot in a side thereof, said longitudinal slot having top and bottom walls which diverge outwardly, and tapered locking elements in said carrier engaging the bottom walls of the longitudinal slots in said lands for forcing said lands against the bottom and side of said land slots.

7. In an inserted land tap, a carrier, a land member formed with a shoulder for engaging the end of the carrier and also formed with a longitudinal slot having an oblique bottom surface, a pair of locking screws in said carrier provided with tapered heads projecting into said longitudinal slot and engaging said oblique surface.

HERBERT J. SMITH.